June 29, 1965   M. ACHTERHOF ETAL   3,192,185
HOMOGENIZED CROSS LINKED POLYURETHANES
Filed May 19, 1959   2 Sheets-Sheet 1

DEGASS AND MIX DIISOCYANATE AND POLYESTER BELOW 300°F.

↓

ADD CROSS LINKER AND CONTINUE HEATING BELOW 300°F. TO THERMOSET FORM

↓

REHEAT ABOVE 300°F. WITH KNEADING BLENDING ACTION

↓

MOLD AT ABOVE 300°F. AND COOL

Fig. 1

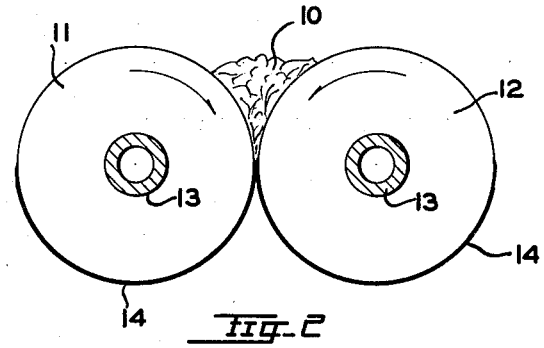

Fig. 2

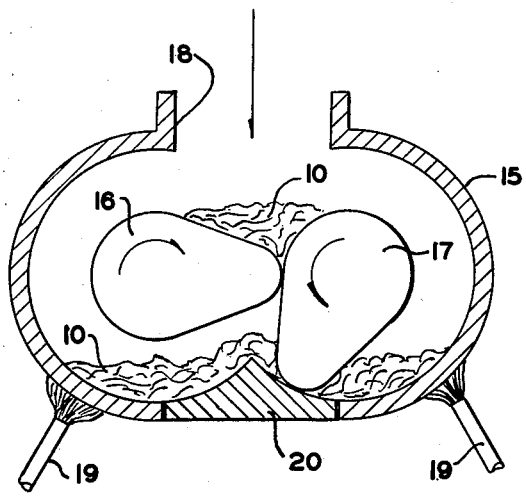

Fig. 3

INVENTORS
MARVIN ACHTERHOF
MILES Q. FETTERMAN
NELSON L. HAVENS
JOHN F. McWHORTER
BY
Oberlin, Maky & Donnelly
ATTORNEYS

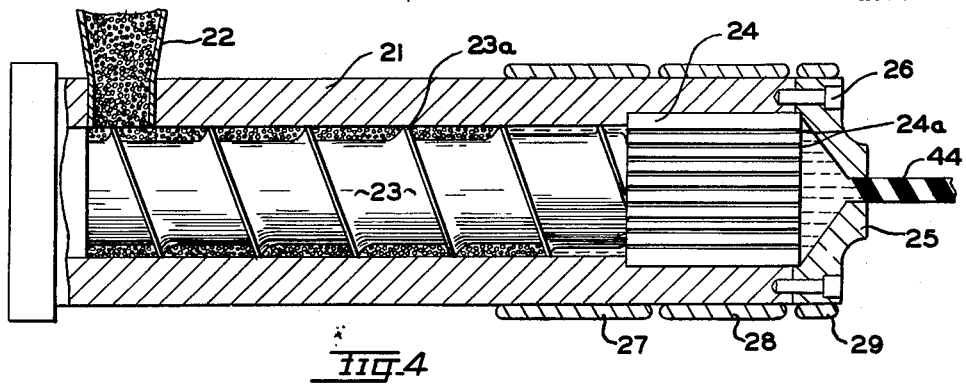
Fig. 4
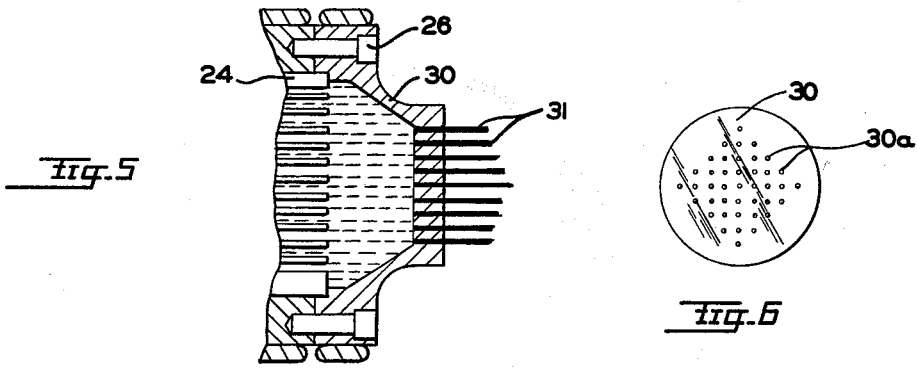
Fig. 5
Fig. 6
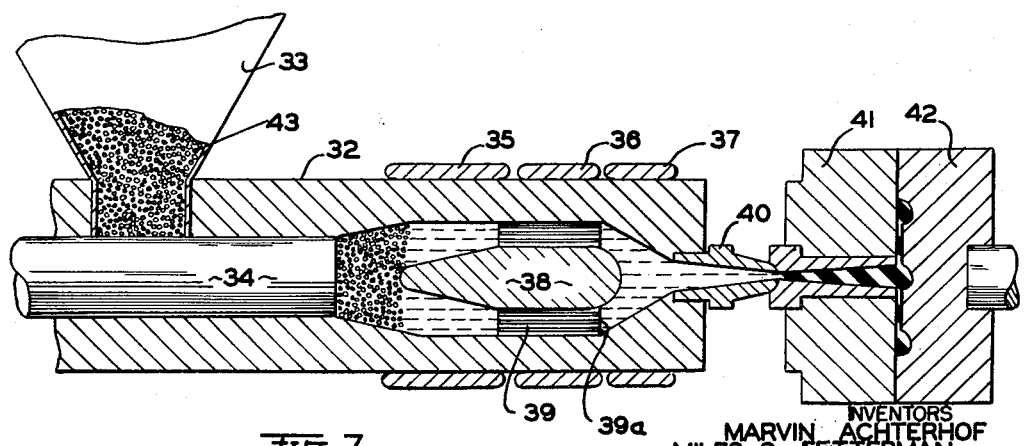
Fig. 7

United States Patent Office 3,192,185
Patented June 29, 1965

3,192,185
HOMOGENIZED CROSSLINKED
POLYURETHANES
Marvin Achterhof, Willoughby, Miles Q. Fetterman, Painesville, Nelson L. Havens, Wickliffe, and John F. McWhorter, Shaker Heights, Ohio, assignors to The Eagle-Picher Company, Cincinnati, Ohio, a corporation of Ohio
Filed May 19, 1959, Ser. No. 814,302
7 Claims. (Cl. 260—75)

The present invention relates to a method of molding a polyurethane and, more particularly, to a method of forming a polyurethane elastomer and to a product resulting thereby.

This application is a continuation-in-part of our copending applications Serial No. 723,949, now abandoned, and Serial No. 785,228, now abandoned.

As described in these applications, the term "polyurethane" refers to a relatively new class of polymers that represent culmination of organic research based on the isocyanates. In general, a urethane may be considered an ester of carbamic acid, and a polyurethane may be regarded as a polymer of the ester in which the repeating unit is a urethane linkage. One method employed for the production of the urethane linkage is the reaction of the isocyanate radical with a compound having an active or labile hydrogen atom and particularly a hydroxyl radical. Thus, polyurethanes may be generally defined as polymers produced by the addition reaction between polyisocyanates and hydroxyl-rich compounds, such as glycols, polyesters, polyethers, polyols, polyamides, phenols, carboxylic acid groups, and the like.

The terms "thermoplastic" and "thermosetting" as applied broadly to resins and polymers, such as those of synthetic origin, have become recognized to indicate fairly definite heat-responsive physical properties. Accordingly, a thermoplastic resin is normally taken as one which softens when heated and hardens when cooled. By alternately heating and cooling such resins, they can be reshaped again and again. Therefore, thermoplastic resins are ideally suited for such molding operations as injection molding, extrusion, and the like wherein, it is emphasized, the processing temperature or treating temperature of the thermoplastic materials prior to the actual molding step is below or at most equal to the molding temperature.

Conversely, a thermosetting resin is normally taken as one which sets or hardens permanently or otherwise becomes infusible when subjected to heat. This permanently hardened state is usually occasioned by the cross-linking of linear chains of the resulting polymer, so that the ultimate polymeric resin may be regarded as one large, three dimensional molecule. Subsequent heating, though it may soften the structure somewhat, cannot restore the flowability that typified the uncured thermosetting resin. Accordingly, thermosetting resins or polymers are molded with greater difficulty in that temperature considerations must be closely watched and controlled to prevent premature curing and insure polymerization at a desired time and place. In any event, it is emphasized that the processing temperature of a thermosetting resin is always considerably below the actual molding or heat forming temperature.

The difference between thermoplastic and thermosetting resins or polymers is in their structural geometry, and the geometry responsible for the thermal behavior of the polymer is related under the functionality theory of D'Alelio, hereinafter more fully discussed, to the number of functional groups of the starting materials which form the polymer. Under this theory as described in "Fundamental Principles of Polymerization" by G. F. D'Alelio, page 52 and following, John Wiley & Sons, Inc., 1952, if the functionality factor of the reactants forming a polymer is less than 2, the resulting polymer will be thermoplastic. If the functionality factor is greater than 2, the polymer will possess a network structure of chains attached to each other by direct chemical bonds and the polymer will be thermosetting.

Elastomers, such as natural rubber, butadiene-styrene, butadiene-acrylonitrile, silicones, and the like are classified as thermosetting resins or plastics from the point of view of heat-flow properties. Such elastomers or rubbers when subjected to elevated temperatures may have a softening or melting point at which they become somewhat fluid or, more accurately, deformable with loss of elasticity. But at the same time, the rubbers become so sticky and viscous that they cannot be molded or indeed otherwise conveniently handled. Moreover, many of such rubbers cannot recover from such a heat treatment. They lose their elasticity and other desired properties, such as tensile strength and tear resistance, and become unfit for many applications.

The elastomeric polyurethanes have been similarly regarded as thermosetting resins. Indeed, polyurethanes prepared as previously indicated do set or cure rather rapidly as expected for a thermosetting material. For example, in the usual practice of molding a polyurethane, a diisocyanate and a compound having an active hydrogen atom such as a polyester resin are degassed and then mixed together with attendant heating. A cross-linking agent of the type known in the art, for example 1,4 butane diol, is normally added and the mixing and heating continued for about half a minute. The material at this juncture is now ready for molding and has a viscosity resembling that of honey at room temperature. However, the material has a very short pouring life that varies from 45 seconds to 4 minutes after which the material is too thick to pour. It will be noted that the polyurethane thus behaves as though it were thermosetting.

Accordingly, the practice in the art of molding polyurethanes has been to follow a one-step molding process and indeed to cast and mold rather quickly before the polyurethane has an opportunity to set. Following this practice, prior art techniques of molding elastomeric polyurethanes has been limited to producing fairly small articles or, at the most, to processing relatively small batches. Also, because polyurethanes have this tendency to thicken in a matter of minutes there is often a substantial quantity of polyurethane remaining in the container from which it was poured which prematurely sets to an unpourable state. This practice results in an appreciable amount of waste which prior to the present invention was not reclaimable.

We have discovered that elastomeric polyurethanes do not necessarily fit into the heat-behavior pattern of either thermoplastic or thermosetting resins but can possess latent thermoplastic properties which enable them to be molded at a more leisurely pace, such that greatly increased quantities can be processed and converted into larger molded articles than has heretofore been the practice. Even though the present polyurethanes are made from reactants having a functionality factor of 2 and even greater than 2, and even though the elastomer formed is cross-linked, the polyurethane after first exhibiting thermosetting properties and setting up as a rigid material in the manner heretofore experienced, can be converted to a thermoplastic state and molded like a thermoplastic resin, as in extrusion or injection molding. Further, upon cooling the polyurethane again acts as though thermosetting at the temperatures of normal use.

So much of the foregoing is disclosed and claimed in our copending application Serial No. 723,949 and Serial No. 785,228. Upon further development, certain difficulties have appeared attending the conversion of the polyurethane to a thermoplastic state and, more particularly, attending the molded products resulting therefrom, especially in small articles having a relatively high surface area per unit weight. As previously indicated, the reaction forming a cross-linked polyurethane proceeds rather quickly. Although converting the polyurethane to a thermoplastic state, as above described, relieves the problem of handling a fast polymerizing polyurethane and permits such a polyurethane to be molded with relative ease and without undue haste, the relatively fast speed of the reaction in the absence of strictly uniform temperature conditions (which are difficult if not impossible to achieve for even short periods of time) results in certain areas or portions of the polymer undergoing more advanced polymerization than still other portions. As a consequence, the portions of more advanced polymerization appear as minute lumps or nodules along the surface of the final, resulting polyurethane product. This difficulty is peculiarly accentuated in polyurethanes formed from relatively low weight ratios of a diisocyanate to the labile hydrogen-containing compound. In accordance with the present invention, it is now possible to mold polyurethane as described to provide products having smooth surfaces which are unblemished by the appearance of such minute lumps and like projections.

It is, therefore, a principal object of the present invention to provide a novel method of making a polyurethane and a novel product resulting therefrom.

Another object is to provide a method for molding polyurethane in which the molding step need not be completed within a relative short period of time.

A further object is to provide a method of molding a polyurethane elastomer wherein the polyurethane behaves as though thermoplastic, such that it may be shaped and molded without premature setting.

A still further object is to provide a method of making a cross-linked polyurethane made from reactants having a functionality factor of 2 and even greater than 2.

A still further object is to provide a method of extruding, injection molding, and the like, a polyurethane, and to provide a polyurethane adapted for such a method.

A still further object is to provide a method of molding a polyurethane wherein the polyurethane behaves as tough thermoplastic and may thus be conveniently molded, and wherein the molded article has a smooth surface unmarred by projecting nodules and lumps.

A still further object is to provide a method of molding a polyurethane in which scrap, flash, and other waste polyurethane material may be reclaimed.

Further objects will become apparent as the description proceeds.

To the accomplishment of the foregoing and related ends, the invention consists of the features hereinafter fully described and particularly pointed out in the claims, the annexed drawing and following disclosure describing in detail the invention, such drawing and disclosure illustrating, however, but one or more of the various ways in which the invention may be practiced.

In the annexed drawing:

FIGURE 1 is a flow diagram of the present method indicating a reaction between a diisocyanate, a polyester, and a cross-linker. The diagram is intended to be generally illustrative of the invention and should not be considered as imparting limitations to the following claims unless specifically set forth in such claims;

FIGURE 2 is a side view of heated mill rollers which may be used in practicing the invention;

FIGURE 3 is a cross-sectional view of mixing apparatus which alternatively may be used in practicing the present invention;

FIGURE 4 is a longitudinal section of an extrusion machine which also may be used in accordance with the present invention;

FIGURE 5 is a fragmentary longitudinal section of the right-hand end of the extruder of FIGURE 4 having an insert adapted to extrude threads, filaments, fibers, and the like of polyurethane;

FIGURE 6 is a right-hand end view of FIGURE 5 illustrating the insert; and

FIGURE 7 is a longitudinal section of an injection molding machine which also may be used in accordance with the present invention.

In carrying out the present invention, a polyurethane is produced from a compound furnishing a free or active hydrogen atom, preferably a polyester or polyether; a polyisocyanate; and a cross-linker such as 1,4 butane diol; such reactants having a functionality factor of at least 2 and preferably greater than 2. After the initial set, the polyurethane is reheated to a thermoplastic state with simultaneous kneading of the mass, and then solidified as by molding the thermoplastic, kneaded material.

More particularly, the initial reaction takes place in a manner known in the art and the resulting liquid is cast or molded at the temperature of the melt into any desired or convenient shape. The melt sets up quickly. Thereafter, the solidified polyurethane is heated above the temperature of the first molding or casting step where it is surprisingly found to exhibit thermoplastic properties.

Thus, the polyurethanes have been found to be affected differently than either thermoplastic or thermosetting resins over a temperature range. For example, the polyvinyl resins soften continuously to a liquid under progressive heating. Butadiene-styrene rubber, on the other hand, maintains its elastomeric characteristics and softens very little while the temperature is progressivly raised up to about 500° F. or higher when such rubbers may soften or flow somewhat but are still unmoldable. The polyurethanes therefore behave like butadiene-styrene rubbers as the temperature is first raised as from room temperature, after which the polyurethanes behave as a thermoplastic like polyvinyl chloride.

Although these unexpected thermoplastic properties enable a polyurethane to be recast or remolded without undue haste into the ultimately desired shape, it now appears that, heretofore, no polymer produced from the time a cross-linker is added until the initial casting or molding is completed is a truly homogeneous polymeric material. The speed of this initial reaction has been previously noted and is largely responsible for the general conclusion that cross-linked polyurethanes are thermosetting. Apparently, the speed of the reaction is so fast that it is not possible to obtain strictly uniform heat dispersion. Certain casting and molding techniques for the initial reaction only accentuate this problem rather than relieve it. For example, if the initially reacted polyurethane is cast on a hot plate or within a mold having heated walls, the polymerization may still be in progress causing further variations in the material. The surface of the casting contacting the plate or mold walls is naturally heated to a greater extent than the interior of the polyurethane or to a greater extent than a surface not so directly heated. In fact, the latter may even be actually cooled by a lower ambient temperature. This difference in temperature produces a more highly polymerized polyurethane on such areas so heated. As a result, the polyurethane cannot polymerize uniformly. It is postulated that if a cross-section of the polyurethane at this stage could be taken, it would be composed of "islands" of more advanced polymerized particles or portions intermingled with a matrix of less advanced polymerized particles or portions. The relative speed of the initial reaction is far beyond the ability of the entire polyurethane mass to homogenize and compensate for the uneven "islands" resulting from variable rates of polymerization in progress throughout the mass.

The difficulty is that when a polyurethane of such variegated polymerization is reheated and then cast or molded in accordance with our prior copending applications, Serial No. 723,949 and Serial No. 785,228, even though the entire mass acquires a thermoplasticity allowing such treatment, the less polymerized and therefore softer matrix passively accommodates migration of the more polymerized and therefore harder particles within the melt. Consequently, the more polymerized "islands" or portions "pop out" or ride to a surface where they appear as minute lumps or nodules. A bumpy or knotty surface renders the ultimate product unfit for many applications where smooth surfaces are needed, such as in joint liners for high load ball bearings, or are desirable such as in decorative trim.

While the "lumpy" problem is understood to be present with all formulations composed of variable ratios of diisocyanate to a labile hydrogen-containing compound, the formulations with lower weight ratios of diisocyanate to such compounds are most troublesome because the matrix is softer and the lumps "pop out" more easily and prominently. Also, the lower heat sensitivity of the softer compounds results in more gassing and porosity which also promotes the formation of the herein described "lumps" or "islands." Polyurethanes formed from the lower ratios of diisocyanate to labile hydrogen-containing compounds are needed for applications wherein their lower stiffness and more resilient (rubber-like) properties are advantageous, such as in seals and insulation.

We have now found that it is possible to avoid the indicated problem by reworking the polyurethane simultaneously with the step wherein the polyurethane is heated to a thermoplastic state or while the polyurethane is so thermoplastic. Here and in the claims, by the term "reworking" is meant an intimate blending or homogenation wherein all portions of the melt undergo a thorough intermixing such as is possible through a shearing action.

The exact mechanism which takes place is not understood, but the lumps and nodules do disappear under the described reworking action. It may be that a refining takes place in which the hard and more polymerized particles or "islands" become literally mashed or otherwise homogenized with the less polymerized particles so that the former lose their identity. Accordingly, there is little or nothing left of the harder more polymerized particles to undergo the described migration to a surface or the migration of what may be left of such harder particles is effectively prevented.

Any mechanical reworking which achieves the intimate blending or substantial homogenation is satisfactory for purposes of the present invention. Such a reworking step may involve a general manipulation of the polyurethane mass, but a reworking in which the mass is kneaded or portions thereof undergo a shearing action is preferred. The best reworking we have found is that afforded by extruding the polyurethane melt and preferably so extruding it several times.

In FIGURE 2, for example, a preset polyurethane which has been reheated to a thermoplastic state, indicated at 10, is fed between rollers 11 and 12 of a mill which rotate toward each other as indicated by the arrows and which are set apart approximately one-sixteenth of an inch at their closest portions. The rollers 11 and 12 are suitably journalled for rotation on shafts 13 which are conventionally power driven. The shafts 13 and rollers are hollow to accommodate a continuous circulation therethrough of Dowtherm in a known manner in order to maintain the rollers at a desired temperature. A layer 14 of polyurethane forms on each roller and is continuously reworked as it engages a companion layer at the bite of the rollers. Milling of this type for about ten minutes provides sufficient reworking although this period of time is not critical. Longer or shorter periods are also operative.

A desired kneading and/or shearing action can be obtained by a mixture such as that illustrated by FIGURE 3. This mixer, which may be like a Banbury type of mixer, comprises a housing 15 containing two arms 16 and 17 axially offset from each other so that the arms are always virtually touching as illustrated during their common rotation. The polyurethane reheated melt 10 is advanced through an opening 18 and reworked by rotation of the arms 16 and 17 while burners 19 maintain a desired temperature. When the reworking is completed, a gate 20 is released and the polyurethane melt 10 discharged therethrough for further treatment such as molding.

However, the best manner of reworking the polyurethane melt that we have found is to extrude it. Although extrusion alone will suffice, in this form of the invention we may also first rework the melt, as by the apparatus of either FIGURES 2 or 3, and then extrude the melt. Just as extrusion is desired as the best reworking technique, even better results are obtained by multi-extrusion, that is, by extruding the same material two or more times. Although in our cited prior copending applications, we indicate that reheating and remolding of the polyurethane cannot be repeated indefinitely, we find that a time factor is also involved. That is, during extrusion the polyurethane melt is subjected to a reheating step only very briefly as compared to the time required for a general overall reheating of the entire polyurethane mass. Accordingly, we have been able to re-extrude many times without deleteriously affecting the physical properties of the polyurethane. We have re-extruded the same material as many as six times without reaching a limit to the maximum number of such re-extrusions possible, if any exists, without adversely affecting the physical properties of the polyurethane.

Although the exact reasons why extrusion produces the best results are not known, it is thought that the action of the thread of the auger in making a close clearance with the journal of the extruder together with the action of a screen plate provides a shearing or kneading action on much of the polyurethane mass. To heighten the effect of the screen plate, we prefer to lengthen it and provide a cartridge of many small parallel tubular passages.

For example, a longitudinal cross-sectional view of an extruder is shown in FIGURE 4. The extruder includes a barrel 21 having a hopper 22. An auger 23 with a helical spiral or thread 23a is mounted for rotation about a longitudinal axis in a manner known in the art. A cartridge 24 having fine tubular passages 24a interfits between the auger 23 and a die 25. The latter has a central opening and is attached by bolts 26 to the discharge end of the barrel 21. The die 25, a cartridge 24, and discharge end in general of the extruder are heated by bands 27, 28, and 29. These bands encircle the indicated end of the extruder and may be standard resistant heaters which maintain the designated parts at an elevated temperature by the passage of electrical current through such bands.

The die 25 of FIGURE 4 may be replaced by the spinneret type of die 30 of FIGURE 5. The latter has a plurality of fine openings 30a through which the polyurethane is extruded as filaments, fibers, or threads 31. These products can be woven or interlaced with each other to form various fabrics or mats of polyurethane.

In any event, if the material is to be re-extruded the initially extruded material is again fed through the hopper 22 of the same or a different extruder. The operation is the same as before.

Injection molding apparatus can also be adapted for the present method as long as sufficient reworking, as previously defined, is provided. Similarly, a heated cartridge can, if desired, also be employed. For example, in the embodiment illustrated by FIGURE 7, an injection cylinder 32 has a hopper 33 and a plunger 34. The latter is reciprocated axially of the cylinder 32 in a manner understood in the art. Electrical heating elements or bands 35, 36, and 37 embrace the extrusion cylinder 32 and also a spreader 38 is supported within the cavity of the cylinder 32. An annular cartridge 39 encircles the spreader 38 and has many fine passages 39a. A nozzle 40 conducts the material into a mold comprising a stationary section 41 and a movable mating section 42. These sections together form a sprue and runner defining a plurality of shapes or voids which are to receive the molding material.

For identification purposes, a compound that contains a free or labile hydrogen atom, which may be used in producing a polyurethane in accordance with the present invention, may further be described as one that will give a positive Zerewitinoff test. That is, any compound which, when added to a Grignard solution of methyl iodide, liberates methane by decomposition of the Grignard reagent. Thus the polyurethane of the present invention includes those reaction products of a diisocyanate with a variety of other compounds meeting the indicated test for a free or active hydrogen atom, such as those compounds having hydroxyl, amino, and carboxyl groups.

The compounds most usually reacted with a diisocyanate are the polyesters, such as linear or branched chain polyesters, and/or polyesteramides which contain free hydroxyl groups, and/or polyethers, and/or other groups containing reactive hydrogen atoms such as amino and/or amido groups.

Thus, the useful polyesters and/or polyesteramides may include those obtained by condensing any polybasic (preferably dibasic carboxylic) organic acid, such as adipic, sebacic, phthalic, isophthalic, terephthalic, oxalic, malonic, succinic, maleic, cyclohexane-1,2-dicarboxylic, cyclohexane-1,4-dicarboxylic, polyacrylic, naphthalene-1,2-dicarboxylic, fumaric, itaconic, glutaric, pimelic, suberic, azelaic, etc., with polyalcohols such as ethylene glycol, diethylene glycol, pentaglycol, glycerol, sorbitol, triethanolamine, di-($\beta$-hydroxyethyl) ether, etc. and/or aminoalcohols such as ethanolamine, 3-aminopropanol, 4-aminopropanol, 5-aminopentanol-1, 6-aminohexanol, 10-aminodecanol, 6-amino-5-methylhexanol-1, p-hydroxymethylbenzylamine, etc.; and with mixtures of the above polyalcohols and amines (ethylene diamine, hexamethylene diamine, 3-methylhexamethylene diamine, decamethylene diamine, and m-phenylenediamine, etc.) and/or amino-alcohols, etc. In the esterification, the acid per se may be used for condensation or, where desirable, equivalent components, such as the acid halide or anhydride may be used.

The alkylene glycols and polyoxyalkylene glycols used in the practice of the invention may comprise ethylene glycol, propylene glycol, butylene glycol-2,3'-butylene glycol-1,3; 2-methyl pentanediol-2,4' 2-ethylhexanediol-1,3' hexamethylene glycol, styrene glycol and decamethylene glycol, etc. and diethylene glycol, triethylene glycol, tetraethylene glycol, polyethylene glycols, dipropylene glycol, tripropylene glycol, polypropylene glycols.

Broadly, any of the prior art polyesters, polyisocyanate-modified polyesters, polyesteramides, polyisocyanate-modified polyesteramides, alkylene glycols, polyisocyanate-modified alkylene glycols, polyoxyalkylene glycols and polyisocyanate-modified polyoxyalkylene glycols, etc. having free reactive hydrogen atoms, free reactive carboxylic and/or especially hydroxyl groups may be employed in the process of the invention. Moreover, any organic compound containing at least two radicals selected from the class consisting of hydroxyl and carboxyl groups may be employed in the practice of the invention. Mixed esters may also be used such as the mixed ester of ethylene glycol and 1,2-propylene glycol with adipic acid; the mixed ester of ethylene glycol and 2,3-butylene glycol with adipic acid; and the mixed ester of ethylene glycol and diethylene glycol with adipic acid.

The polyesters used are generally liquids of moderate molecular weight, for example 600 to 2600, and terminate principally in hydroxyl groups. The polyesters vary in their degree of branching. Linear polyesters usually lead to elastic polyurethanes and are therefore employed where more resilient products are are desired, whereas the highly branched polyesters produce more rigid polyurethanes.

The organic polyisocyanates useful in the practice of the invention include diphenylmethane-4,4'-diisocyanate; 3,3'-dimethyldiphenylmethane-4,4'-diisocyanate; ethylene diisocyanate; ethylidene diisocyanate; propylene-1,2-diisocyanate; butylene-1,4-diisocyanate; hexylene-1,6-diisocyanate; cyclohexylene-1,2-diisocyanate; m-phenylene diisocyanate; 2,4-toluylene diisocyanate; 1,6-toluylene diisocyanate; 3,3'-dimethyl-4,4'-biphenylene diisocyanate; 3,3' - dimethoxy - 4,4' - diphenylene diisocyanate; 3,3'-diphenyl-4,4'-biphenylene diisocyanate; 4,4'-biphenylene diisocyanate; 3,3'-dichloro-4,4'-biphenylene diisocyanate; triphenylmethane triisocyanate; 1,5-naphthalene diisocyanate; or polyisocyanates in a blocked or inactive form such as the bis-phenyl carbamates of toluylene diisocyanate, p-phenylene diisocyanate, and 1,5-naphthalene diisocyanate, etc.

Useful cross-linking agents, in addition to 1,4 butane diol, include other polyalcohols, such as ethylene glycol, propylene glycol, butylene glycol, diethylene glycol, triethylene glycol, glycerol, and the like. Aromatic cross-linkers such as 1,4 di-(hydroxyethyl) benzene may also be used.

The urethane reaction may be promoted by an accelerator or catalyst, although polyurethanes have been formed without the use of any accelerator. Tertiary amines make good catalysts. The base strength of a particular tertiary amine is not necessarily the sole criterion for catalytic activity since steric effects are also important. Among the catalysts or accelerators which can be used are alcohols, amino and diamino compounds such as 1,4 butane diol, N-methyl morpholine, dimethyl ethanolamine, triethylamine, N,N' - diethylcyclohexylamine, N,N' - dimethylcyclohexylamine, dimethylhexahydroaniline, diethylhexahydroaniline, and cobalt naphthenate. As is recognized in the art insofar as reaction with isocyanato groups and the production of polyurethane plastics are concerned (note U.S. Patent 3,070,556), if an amino group is either primary or secondary, there can be reaction with an isocyanato group. If the amino group is a tertiary amino group, there is no reaction but the compound serves as a catalyst. If the compound having a tertiary amino group also has a reactive hydrogen-containing group, such compound will act both as a catalyst and a reactant with isocyanato groups. The amount of catalysts used does not appear to be critical; from 3 to 20 parts by weight of the catalyst per 100 parts by weight of a polyester resin have been used although quantities outside of this range are also effective.

In accordance with the present invention, the reactants forming the cross-linked polyurethane elastomer have a functionality factor of 2 and even more than 2 as defined by the D'Alelio theory. For instance, in a reaction of 1 mol of a polyester having 2 functional groups with 2 mols of a diisocyanate having 2 functional groups per mol, and 1 mol of a cross-linker having 2 functional groups, there is a total of 4 mols and 8 functional groups for a functionality factor of 2 (8 divided by 4).

However, it is preferred to use an excess of the diisocyanate needed to react with the polyester or equivalent reactant so that, after the first reaction which is a chain extension essentially, there appears an intermediate reactant which has 4 active endings or groups including at least 2 urethane hydrogen atoms. There is also a possibility of dimeric or even trimeric diisocyanates being formed which add even more active groups.

Example 1 indicates what is believed to occur. There are in one polyester molecule 2 active endings furnished by the hydroxyl groups (R representing the balance of the polyester); in the 2 molecules of the diisocyanate there are 2 groups per molecule or a total of 4 active endings or functional groups furnished by the isocyanate groups (M representing the balance of the diisocyanate structure); and in 1 mol of the cross-linker there are 2 active endings furnished by the hydroxyl groups. This makes a total of 8 active endings in the total of 4 molecules, as above noted, or a functionality factor of 2.

When an excess of isocyanate is used, an intermediate linear product is formed as indicated in Example 1. This molecule has 2 active endings as well as 2 active urethane hydrogens which are the hydrogens connected to a nitrogen atom. If these active endings or functional groups are added to those above expressed, there results from 4 molecules of the original reactants a total of 12 active endings or a functionality factor of 3. Even including the intermediate compound formed by the presence of the excess diisocyanate as an additional reactant, there are 12 active endings for 5 mols of reactants or a functionality factor of 2.4 (12 divided by 5). Since in either instance, the functionality factor exceeds 2, the resulting polymer would be expected to be thermosetting.

It will be noted that to form the intermediate reactant, it is essential to keep the mols of the diisocyanate in excess as compared to the mols of the polyester or other compound having the labile hydrogen atom. This keeps the terminal endings active with isocyanate groups, so that the reaction is sure to lead to a network structure and three dimensional giant molecules. As noted, there is the possibility that other intermediates as well as dimers and trimers are formed during the reactions. In such cases, the functionality is certain to be above 2 and according to D'Alelio, the resulting polymer will possess a network structure of chains attached to each other by direct chemical bonds.

We have found that it is possible to maintain a molar excess of the diisocyanate by reacting at least about 20 parts by weight of a polyisocyanate to about 100 parts by weight of a polyester or a polyether. An amount of about 40 parts by weight of the diisocyanate per 100 parts of polyester represents generally about three times the theoretical quantity needed for reaction on a mol basis. A molar amount of the cross-linker can be used substantially equal to one-half of the molar amount of the isocyanate compound. In practice, we may use from about 3 percent to about 27 percent or more by weight of the total of a cross-linker depending on the amount of diisocyanate employed. For best results, we prefer to use a sufficient amount of each reactant so that after the initial reaction of the diisocyanate, polyester resin, and cross-linker, there is a fairly uniform excess of the diisocyanate to form intermediate products, such as is illustrated by Example 1. This excess is preferably about 0.20 to 0.22 mol of the diisocyanate for each mol of the polyester originally reacted.

For each mol of a polyester, Table I gives the mols of the other reactants employed to produce seven different polyurethanes initially reacted in accordance with the present invention. It will be noted that the excess diisocyanate is substantially constant in each case. The actual reactants for the data of Table I are a polyester comprising the same adipic acid-glycol condensate, a diphenylmethane diisocyanate, and a cross-linker of 1–4 butane diol. However, since the data are presented on a mol basis, it will be apparent that like mol ratios of other possible reactants, previously noted, may be used. Thus, in accordance with the present invention, the polyester, polyether, or other like active hydrogen-containing compound, the diisocyanate, and the cross-linker may be interreacted in a range of molar ratios from about 1:1.6:0.38, respectively, to about 1:8:6.8, respectively, wherein it will be noted the diisocyanate is used in molar excess with respect to the additive molar amounts of both such compound and cross-linker, preferably providing an excess of diisocyanate after the initial interreaction of about 0.20 to about 0.22 mol of diisocyanate per mol of polyester resin originally reacted. The preferred range of molar ratios for producing a polyurethane which is to be extruded extends from about 1:3.2:2 to about 1:8:6.8 for the polyester, diisocyanate, and cross-linker, respectively.

Below a ratio of 20 parts by weight of diisocyanate to 100 parts by weight of a polyester or polyether resin, the polyurethane is tough and does not extrude well. There does not appear to be an upper limit of the ratio of diisocyanate to polyester for forming a remoldable polyurethane. We have reacted 100 parts by weight of a diisocyanate to 100 parts by weight of a polyester and successfully extruded the resulting polyurethane elastomer in the manner herein described.

As previously mentioned, the problem of bumpy or knotty surfaces is more acute in polyurethanes formed from the lower ratios of diisocyanate to the labile hydrogen-containing material. Accordingly, the invention is most advantageously adapted to polyurethanes prepared from a ratio of about 20 to about 60 parts by weight of the diisocyanate to about 100 parts by weight of a labile hydrogen-containing compound.

In general, as noted and illustrated in our copending application, Serial No. 785,228, the polyurethanes have a minimum temperature for plastic flow which rises rapidly as one passes from a low diisocyanate to polyester ratio up to about 40 parts by weight of diisocyanate to about 100 parts by weight of the polyester resin. As the diisocyanate content is further increased, the polyurethanes have a more even plastic flow response to the minimum temperature required and therefore are more easily worked with for extrusion and the like. For example, as the amount of diisocyanate increases 2½ times with no increase in the amout of polyester, that is, from 40 to 100 parts per 100 parts of polyester, there is an increase in temperature as determined by A.S.T.M. D926–56 of only 50° F. Moreover, below a ratio of 40 parts by weight of diisocyanate to 100 parts by weight of polyester resin, the resulting polyurethanes behave like cured or partially cured rubber and for this additional reason are less easily extruded. Still further, as the amount of diisocyanate employed increases, the resulting polyurethanes increase in hardness.

On the other hand, as the amount of diisocyanate increases, the ultimate polyurethanes also require a higher temperature for the second or final molding step. The preferred upper limit is about 100:100 parts by weight of diisocyanate to polyester or polyether resin, etc. As one increases the diisocyanate content within the range of 40 to 100 parts per 100 parts of polyester, the extrusion of the polyurethane elastomers is facilitated and proceeds more smoothly. However, polyurethanes prepared from still higher ratios of diisocyanate to polyester, although extrudable, are inclined to be rather tender and to tear, for example, in removal from an injection mold. These polyurethanes are not sufficiently viscous to provide a desired smooth extrusion or injection molding action. Also, still higher operating temperatures must be employed for these polyurethanes produced from still higher diisocyanate to polyester ratios, so that the temperature becomes an increasingly important factor to commercial operation. Accordingly, the preferred range for extrusion, injection molding, and the like (from the standpoint of the facility of performing these operations per se) is from about 40 to 100 parts of diisocyanate per 100 parts by weight of a polyester resin or like hydrogen-containing compound. A polyurethane prepared from 60 parts of a diisocyanate, 100 parts of a polyester comprising an adipic acid-glycol condensate, and 36 parts of a cross-linker has been found to be very well suited for extrusion.

The manner of initially preparing a polyurethane, as by polyaddition, is known in the art. Reference is made, for example, to United States Patents No. 2,577,279; No. 2,620,516; No. 2,621,166; No. 2,729,618, and No. 2,764,565 for information on such preparation, such patents being hereby incorporated by reference. For instance, as illustrated by FIGURE 1, a polyisocyanate and a polyester resin are degassed, then mixed and heated within a range from just above room temperature to about 300° F. A cross-linker of the type described may next be added and in an amount within the range disclosed. During this initial reaction, the polyurethane exhibits generally thermosetting properties, that is, the polyurethane hardens and to all intents and purposes becomes infusible. This has led, as previously noted, to attempts quickly to mold the polyurethane during this reaction and before the material has set which usually is within a very short period of time. In practice, this initial reaction may be treated as a molding step or the material may be merely cast as a slab in order to provide a practical manner of physically obtaining the polyurethane. Such treating steps unavoidably serve to accentuate the uneven polymerization rates with the production of "islands" of more advanced polymeric growth. In any event, the previous difficult pouring techniques are entirely eliminated since the material may be allowed to "thermoset" within the reaction kettle. The material may be subsequently fully baked as in an oven if desired at about 110° C. for about 24 hours to complete the initial reaction although this is not necessary. Even if employed, the baking does not eliminate the defined "islands."

Following the initial reaction, the polyurethane is again heated at a temperature above the original or first molding temperature, whereupon the material has surprisingly been found to behave as though thermoplastic. Simultaneously, the thermoplastic melt is reworked in accordance with the present invention. The lowest or initial temperature at which thermoplasticity begins varies for different polyurethanes but can easily be determined by simple trial and error. However, for most polyurethanes thermoplasticity can be realized above 300° F. and generally within the range of about 300° F. to about 500° F.

While the polyurethane material is thus in a flowable state, as contrasted with the sticky, "chewing gum" consistency of rubber when it is heated to a melting or flow point, and following the kneading or intimate blending of the melt, the polyurethane is cast or molded to a desired form by any of the conventional techniques. There is no need for haste since the thermoplastic properties remain for an appreciable length of time. After so forming the thermoplastic polyurethane, the molded article is allowed to cool. The cooling may be accomplished by merely allowing the molded article to return to room temperature, or the cooling may be hastened by standard means.

If extrusion is to constitute the reworking, following the initial reaction the "thermoset" polyurethane material may be converted to a granular or pelletized form. The granules or pellets are then fed to known plastic molding machines wherein the present polyurethanes are heated to thermoplasticity and then molded as desired. For instance, referring to FIGURE 4, pellets or "shot" 43 of polyurethane obtained as described may be fed from the hopper 22 into the interior of the extruder barrel 21. In practice bands 27, 28, and 29 may be heated to 320° F., 310° F., and 300° F., respectively. As the pellets 43 pass toward the die 25, they are raised in temperature above the first molding or forming temperature and become sufficiently fluid to pass through the cartridge 24, eventually to be extruded as a pipe or cylinder 44 or in other desired shapes. By controlling the temperature and dissipation thereof, the polyurethane solidifies simultaneously with the extrusion action or shortly thereafter. Extrusion has been performed with polyurethanes of the present invention with the urethanes having a temperature within the range of about 300° F. to about 350° F.

If desired the present polyurethanes may also be injection molded as illustrated in FIGURE 7. In this embodiment the pellets 43 are also fed through a hopper 33 to the interior of the injection cylinder 32. The action is similar to that of FIGURES 4 through 6. As the pellets are forced to the right of FIGURE 7 by the plunger 34 and through the cartridge 39, the pellets 43 are heated by the bands 35, 36, and 37 above their original forming temperature and to a state of plasticity in which the fluid material resulting thereby is easily injected into the sprue and runner areas between the mold sections 41 and 42. After cooling the molded articles are removed in a conventional manner without further heat-curing. Injection molding has been performed with polyurethanes of the present invention during which the polyurethanes were reheated for a second molding step to a temperature within the range of about 325° F. to about 400° F.

In order to demonstrate the invention, the following examples are set forth for the purpose of illustration only. Any specific enumeration or detail mentioned should not be interpreted as limitations of the invention unless specified as such in one or more of the appended claims and then only in such claim or claims.

EXAMPLE 1

*Calculation of functionality factor*

| Mol | | Active Groups |
|---|---|---|
| 1 | HO—R—OH—Hydroxyl polyethylene adipate, e.g. | 2 |
| 2 | OCN—M—NCO—Diphenylmethane diisocyanate, e.g. | 4 (2 mols) |
| 1 | HO(CH$_2$)$_4$OH—1,4,—Butane diol | 2 |
|   | Excess Isocyanate: | |
| 1 | OCN—M—N—C—O—R—O—C—N—M—NCO<br>       \|   \|\|                    \|\|  \|<br>       H   O                      O  H | 4 |
| 5 | | 12 |

EXAMPLE 2

A linear polyester resin was conventionally formed by reacting about 14 to 15 parts by weight of ethylene glycol with about 13 parts by weight of adipic acid until the reaction product had a hydroxyl number of about 54, indicating a molecular weight of about 2,000. The excess glycol was then removed and the polyester resin was then degassed. Diphenylmethane-4,4'-diisocyanate was added to the vessel in excess of the ratio of 2 mols of diphenylmethane-4,4'-diisocyanate to 1 mol of the polyester. The mixture was stirred, heated at about 293° F. and further degassed for about 25 minutes after which a catalytic cross-linking agent, 1,4'-butane diol was added in molar quantities substantially equal to the number of mols of the polyester. The resulting mixture was then further stirred for about 30 seconds at 260° F. In less than 4 minutes the material had gelled. The reaction product was then baked in an oven at 110° C. for 24 hours.

The polyurethane from the previous steps was then reheated to about 350° F. and kneaded in an apparatus similar to that illustrated in FIGURE 3 for about 10 minutes, after which the material was transferred to a mold. There was a dwell time of a molding pressure of 2 minutes, the mold pressure being 35,000 p.s.i. At this temperature of 350° F., the polyurethane was found to behave as though thermoplastic. This plasticity enabled the material to be easily kneaded as described and then shaped in the mold. The material was allowed to cool to 250° F. before de-molding, and finally cooled to room temperature. The surface of the resulting product was smooth and free of projecting lumps.

EXAMPLE 3

A procedure was carried out like the procedure of Example 2 except that the polyester reacted with the diphenylmethane-4,4'-diisocyanate was similarly formed from 1,2 propylene glycol and adipic acid. The reworking step was performed with apparatus similar to that illustrated in FIGURE 2. The polyurethane layer formed on the mill rollers was also free of surface lumps and nodules.

EXAMPLE 4

A procedure was carried out like the procedure of Example 2 except that the polyester reacted with the diisocyanate was similarly formed from 2,3 butylene glycol and adipic acid. Also the gelled material was chopped and then fed to an extruder to effect the reworking thereof. A cylinder of smooth polyurethane was extruded.

EXAMPLE 5

A polyamide was prepared by reacting phthalic anhydride with ethanolamine in substantially equal parts by weight. The polyesteramide was degassed at about 0.5 mm. of mercury for about 30 minutes. About 50 parts by weight of hexamethylene diisocyanate were added to about 100 parts by weight of the polyesteramide together with about 3 percent by weight of the total mass of ethylene glycol as a cross-linking agent, the reactants thereby together having a functionality factor greater than 2. The mixture was stirred for about 3 minutes at 200° to 212° F. and then cast as a slab at this temperature over a refractory surfaced table. The melt set up in about 4 minutes to a hardened state.

The slab was allowed to cool to room temperature and then cut into small segments. The segments were fed to a hopper of an extrusion machine such as is illustrated in FIGURE 4 and heated to about 340° F. at which temperature the segments again became a fluid melt that was extruded as a tube and also, in a separate operation, as threads. Both products were free of surface lumps.

EXAMPLE 6

The extruded tube obtained in Example 5 was cut into chips which were again fed into an extruder and subsequently reextruded in tube form. The surface of the latter was extremely smooth and free of even the slightest surface projections.

EXAMPLE 7

A polyester was conventionally prepared from succinic acid and propylene glycol. After the polyester was degassed as described for the polyesteramide in Example 5, about 60 parts by weight of phenylene diisocyanate per 100 parts by weight of the polyester and about 4 percent by weight of the total mass of glycerol as a cross-linking agent, the reactants together with an intermediate compound formed by the excess of the diisocyanate together having a functionality factor greater than 2. The mixture was stirred for about 3 minutes at 200° F. to 212° F. and then quickly poured into a series of cylindrical molds about 1½ inches in diameter. The resulting cores or cylinders of polyurethane set quickly and after cooling to about 75° F. and removal from the molds were sliced into thin discs.

The discs were then fed to an injection molding machine such as is illustrated in FIGURE 7. The polyurethane discs were next heated above the original molding temperature to about 360° F. at which temperature they were injection molded into a desired form having a desirably smooth surface.

TABLE I.—MOLAR RELATION OF REACTANTS

| Polyurethane Specimen | Mols of Adipic Acid-Glycol Condensate | Mols of 1-4 Butane Diol | Mols of Diphenylmethane Diisocyanate | Excess Mols of Diisocyanate |
|---|---|---|---|---|
| A | 1 | 0.38 | 1.6 | 0.22 |
| B | 1 | 0.78 | 2.0 | 0.22 |
| C | 1 | 1.26 | 2.4 | 0.20 |
| D | 1 | 2.0 | 3.2 | 0.20 |
| E | 1 | 3.6 | 4.8 | 0.20 |
| F | 1 | 5.1 | 6.4 | 0.20 |
| G | 1 | 6.8 | 8.0 | 0.20 |

It will now be apparent that the present invention provides a novel method of molding a polyurethane and a novel product resulting therefrom free of the described "islands." In accordance with the present method, the molding step need not be completed within a relatively short period of time, and it is possible to use a large batch for the production of various articles instead of pouring such an article into an individual mold from a batch quantity substantially equalling the mold in volume. By employing the present method, large quantities of molded, apparently thermosetting materials can be processed in which such materials are delivered to conventional molding and/or extruding equipment. As used herein, the term "extrusion" is taken to include injection molding and other like operations. This avoids the restrictions which presently exist in forming polyurethanes and which lead to the casting or pouring of the polyurethanes with attendant waste.

By reworking the polyurethane, melt while thermoplastic, surface knots, lumps, etc., are eliminated. What changes take place or in what manner such elimination is achieved is not known, and therefore the present products are claimed herein by their method of preparation.

Other forms embodying the features of the invention may be employed, change being made as regards the features herein disclosed, provided those stated by any of the following claims or the equivalent of such features be employed.

We therefore particularly point out and distinctly claim as our invention:

1. A method of shaping a polyurethane comprising interreacting at a temperature from about room temperature to about 300° F. a substantially linear organic compound having at least two terminal active hydrogen atoms as determined by a positive Zerewitinoff test selected from the group consisting of glycols, polyesters, polyoxyalkylene glycols, and polyesteramides; an organic polyisocyanate; and a cross-linking agent consisting essentially of a compound having from two to eight carbon atoms and having at least two terminal active hydroxy groups; said compound, polyisocyanate, and agent being so reacted within the range of molar ratios from about 1:1.6:0.38 to about 1:8:6.8, respectively, wherein such polyisocyanate is used in molar excess with respect to the additive molar amounts of both said compound and agent to form a cross-linked hardened polyurethane elastomer; whereby due to the speed of the reaction and resulting lack of uniform heat distribution, some portions of the polyurethane undergo more advanced polymerization than other portions; heating the resulting cross-linked elastomer sufficiently above 300° F. and within the range of about 300° F. to about 500° F. to convert the elastomer to a moldable melt; homogenizing the moldable melt to blend together the more polymerized portions with such other portion; and then shaping the homogenized melt to a desired form.

2. The method of claim 1 wherein said organic compound is a polyester resin formed by reacting a dibasic acid selected from the group consisting of malonic, succinic, adipic, maleic, sebacic, phthalic, isophthalic, terephthalic, oxalic, cyclohexane-1,2-dicarboxylic, cyclohexane-1,4-dicarboxylic, naphthalene-1,2-dicarboxylic, fumaric, itaconic, glutaric, pimelic, zuberic, and azelaic acids with a polyalcohol selected from the group consisting of ethylene glycol, diethylene glycol, propylene glycol, butylene glycol, pentaglycol, hexane diol, butane diol, glycerol, and sorbitol.

3. The method of claim 1 wherein said organic compound is a polyester resin having a molecular weight within the range of about 600 to about 2600.

4. The method of claim 1 wherein the cross-linking agent is selected from the group consisting of 1,4 butane glycol, ethylene glycol, propylene glycol, butylene glycol, diethylene glycol, triethylene glyco, and gycerol.

5. The method of claim 1 wherein said shaping is carried out by extruding said homogenized melt.

6. The method of claim 5 wherein the extruded polyurethane is again heated to a temperature within the range of about 300° F. to about 500° F. to convert it to a moldable melt, and wherein the moldable melt is again extruded more thoroughly to blend together the more advanced polymerized portions with such other portions.

7. The method of claim 1 wherein said homogenization is carried out by subjecting such melt to a kneading-shearing action to obtain substantially uniform heat dispersion throughout the melt and intimately to blend together the more advanced polymerized portions with such other portions, and then shaping the blended melt to a desired form.

References Cited by the Examiner

UNITED STATES PATENTS

| | | | |
|---|---|---|---|
| 2,713,884 | 7/55 | Schwartz | 260—75 |
| 2,764,565 | 8/55 | Hoppe et al. | 18—48 |
| 2,729,618 | 1/56 | Muller et al. | 260—75 |
| 2,741,800 | 4/56 | Brockway | 18—58 |
| 2,755,266 | 7/56 | Brenschede | 260—75 |
| 2,871,218 | 1/59 | Schollenberger | 260—75 |
| 2,937,151 | 5/60 | Broeck et al. | 260—75 |

FOREIGN PATENTS

| | | |
|---|---|---|
| 944,285 | 6/56 | Germany. |
| 783,615 | 9/57 | Great Britain. |
| 790,543 | 2/58 | Great Britain. |

OTHER REFERENCES

Lockwood: "Supplemental Report on Applications of Diisocyanates," page 6, Technical Industrial Intelligence Division, U.S. Dept. of Commerce, published September 15, 1947, FIAT Final Report No. 1301.

Modern Plastics, November 1954, pp. 106–108, 214–216, "Polyurethane and Polyester Foams."

LEON J. BERCOVITZ, *Primary Examiner.*

ALEXANDER H. BRODMERKEL, MILTON STERMAN, HAROLD N. BURSTEIN, *Examiners.*